April 30, 1968 H. L. BAUMBACH 3,380,172
FILM GAUGE
Filed May 10, 1966
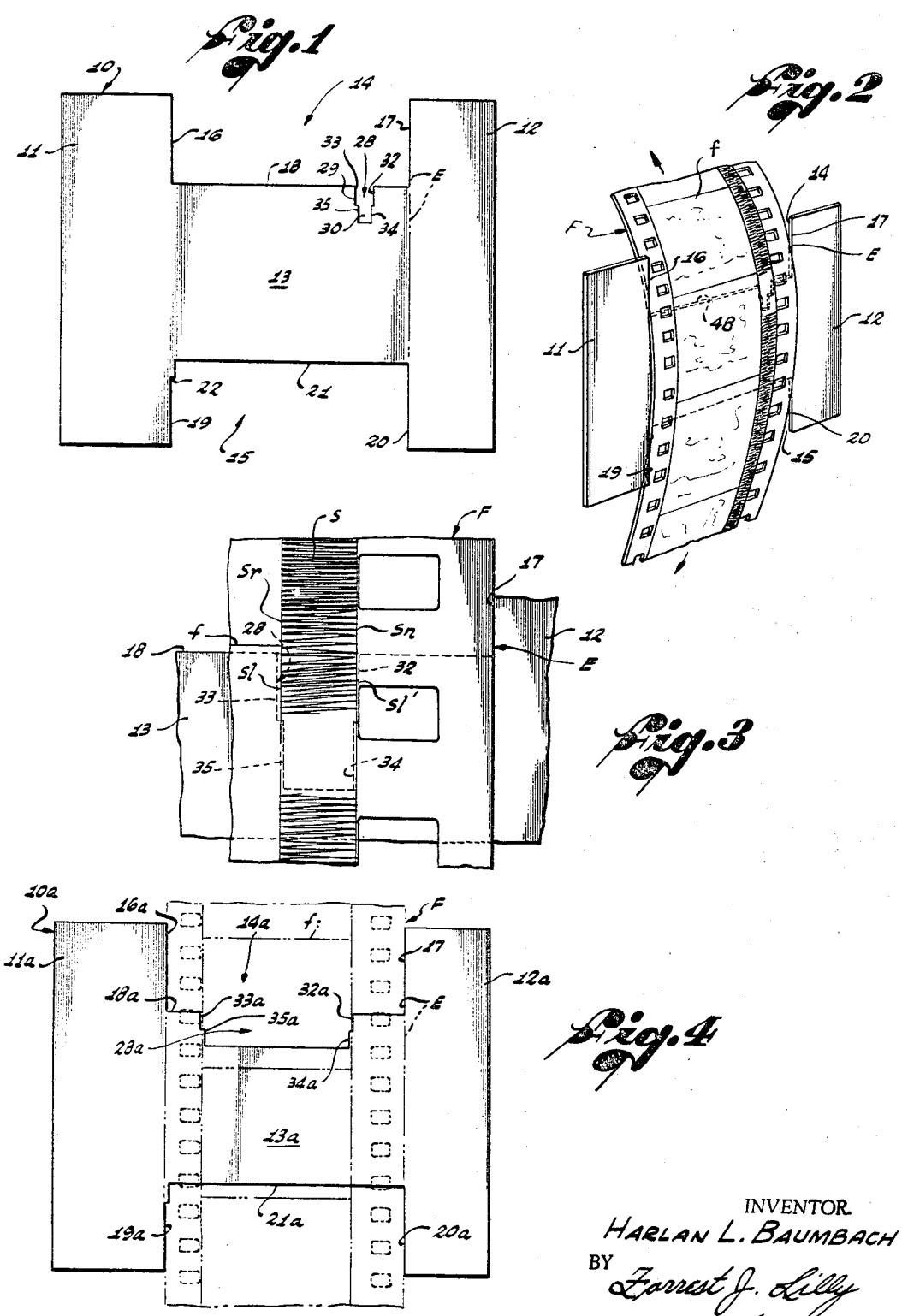
INVENTOR.
HARLAN L. BAUMBACH
BY Forrest J. Lilly
ATTORNEY

United States Patent Office 3,380,172
Patented Apr. 30, 1968

3,380,172
FILM GAUGE
Harlan L. Baumbach, 14332 Mulholland Drive,
Los Angeles, Calif. 90024
Filed May 10, 1966, Ser. No. 548,968
4 Claims. (Cl. 33—180)

ABSTRACT OF THE DISCLOSURE

A gauge for motion picture film comprising an H-shaped plate whose upper and lower notches can receive a strip of film looped over its bridge piece, with the latter having a straight edge over which the film can be flattened for precise measurement. The distance between the legs of the H-shaped plate is equal to maximum permissible film width, and the distance between a step on the inside edge of one leg of the inside edge of the other is equal to minimum permissible film width. A stepped notch formed in the bridge piece permits determination of proper locations for longitudinal lines on the film, such as sound track boundaries.

---

This invention deals generally with gauges and, more particularly, with a "go or no-go" gauge adapted for determining the conformity of printed motion picture film to prescribed industry standards.

For example, standards to which printed 35-mm. motion picture sound film must presently conform include the film width, which may have a permitted tolerance of ±.001 inch, the locations of the two side edges of the picture frames from a predetermined edge of the film, called the reference edge, and which locations have a tolerance of ±.002 inch, and the locations of the two longitudinal edges of the sound track from the reference edge of the film. In this case, the edge of the sound track adjacent to the picture frame area has a tolerance of ±.002 inch, while the edge adjacent the sprocket perforations has a tolerance of ±.001 inch. The specified standards and tolerances assure that the picture area and sound track will either overlap very slightly, or else just precisely meet, so that there will be no "white line" therebetween. The standard locations for the sound track area also assure that it will not encroach on the sprocket perforations, which can cause noise when the recorded sound is reproduced. Actually, the standards themselves, the specified tolerances, and the reasons therefor are so well known in the art as to require no discussion herein.

Film as supplied by the manufacturer usually conforms accurately with standards. After processing and printing, however, the film often fails to conform to standards within specified tolerances. Aging also results in shrinkage which often takes the dimensions of the film outside the standards. This leads to varying well-known problems at the time of printing and projection.

Film is thus commonly outside predetermined specifications, which fact is generally overlooked or neglected, and sometimes becomes very troublesome.

A failure of the printed film to conform to specifications may amount to only a thousandth, or of the order of ten-thousandths, and such errors are very difficult to discover or verify. Very expensive optical measurement equipment capable of making the necessary measurements is available but is difficult to use and is seldom employed.

There is thus a very pressing need for a simple and inexpensive gauge for motion picture film, of the necessary high precision, which is easy to use, and is capable of rendering accurate data. It is the purpose of the present invention to provide such a film gauge.

In the drawings:

FIG. 1 is a plan view of an illustrative film gauge in accordance with the invention, of a type for determining conformity of sound track edge locations in relation to the reference edge of the film;

FIG. 2 is a perspective view showing the gauge of FIG. 1 in use;

FIG. 3 is an enlarged plan view of a portion of the gauge of FIG. 1, with film in position thereon; and FIG. 4 is a view similar to FIG. 1 but adapted for the picture area instead of the sound track.

With reference to FIG. 1, a film gauge 10 for standard 35-mm. sound track film is shown in a form for gauging the width of the film, and the locations of the two edges of its sound track. The gauge is shown to double scale, but with certain dimensions exaggerated for clarity, as will be mentioned. The gauge is made of sheet metal, and is conveniently made in the shape of an H, having two horizontally spaced, parallel, vertical legs 11 and 12, and a horizontal crosspiece or bridge 13 at right angles to the legs 11 and 12. A film strip F to be gauged is inserted into the notches between the legs 11 and 12, above and below the bridge piece 13, and pulled down over the upper edge of the latter, as explained presently. The gauge may also be considered as comprised of a plate, formed with upper and lower opposed rectangular film-receiving notches 14 and 15, of which the notch 14 is defined by straight, parallel side edges 16 and 17 and a straight bottom edge 18 at right angles to the edges 16 and 17, and the notch 15 is defined by straight parallel side edges 19 and 20 and a straight bottom edge 21 at right angles to the edges 19 and 20. Edges 16 and 19 are rectilinearly aligned with one another. The edges 17 and 20 are also rectilinearly aligned and, taken together, are, in the present example of the invention, designated as the film reference edge or line E of the gauge.

The lower notch 19 is modified in one corner by a short step 22 raised a distance of .002 inch above the line of the edge 19. This step 22 may be, for example, .01 inch in length, and it is parallel to the edge 19. The two inside or bottom edges are precisely parallel, and precisely spaced by a predetermined distance such that a strip of standard film to be gauged should be just nicely received therebetween when the film is pulled and bent across the transversely disposed edge 18. The width standard for 35-mm. film is 1.377"±.001". The spacing between the edges 16 and 17, and also the spacing distance between edges 19 and 20, is then made 1.378", so that film of maximum acceptable width will, when its transverse curvature is removed, in the manner shortly to be explained, just barely fit between the edges 16 and 17.

The distance between the step 22 and the leg edge 20 is 1.376", and the step 22 accordingly narrows the notch 15 in the bottom, alongside said step, by .002" to 1.376". If the film, when transversely flattened, will fit easily (as with a ten-thousandth clearance) between the step 22 and the edge 20, it is then to be taken as below standard width. A film whose width is 1.377"±.001", and thus conforms to standard width, will, when transversely flat, enter the notches 14 and 15, but will not easily clear the step 22.

Film tends generally to assume normally a certain degree of transverse curvature, as is well known, and must be transversely flattened while gauging its width or other lateral dimensions. This is accomplished with the present gauge by looping the film strip over the bridge piece 13 and down into the notches 14 and 15 above and below it, and then pulling the strip taut over the straight upper horizontal edge 18 of the bridge piece. FIG. 2 shows the film being thus pulled across the edge 18, and thereby transversely flattened within the region of the notch 14 just above the edge 18. If the film strip fits between the leg edges 16 and 17 under these conditions with no observable crowding or bulging, it is within the standardized maximum width limit. To check for conformity to the minimum width limit, an attempt is then made, as also represented in FIG. 2, to move the film strip deep enough into the lower notch 15 to pass the step 22 and engage the lower straight bridge edge 21. If the step 22 cannot be thus passed, the film is safely above the minimum permissible narrowness limit. If the step 22 can be passed, the film strip is then stretched across the bridge edge 21, and thus, if possible, completely transversely flattened thereat. If the film strip can be thus flattened across the edge 21, without crowding, or with the slightest of play between the step 22 and the edge 20, it has then been proved to be narrower than standard minimum width. If, on the other hand, the film when thus stretched and flattened across the edge 21 snugly engages both the leg edge 17 and the step 22, or buckles or bulges at least slightly therebetween, it may be regarded as meeting the minimum width standard.

The gauge also checks for conformity to standards of the spacings of the two edges of the sound track from the reference edge of the film. According to 35-mm. sound film standards, the edge of the sound track nearest to the "reference edge" of the film strip shall be .192"±.001" from the reference edge, and the more remote edge of the sound track shall be .308"±.002" from the reference edge.

To verify conformity of a printed sound track film strip to these dimensions, the following provisions are made. A vertical slot 28 is formed in the top of the bridge piece 18, and is divided into an upper portion 29 of a predetermined width, and a lower portion 30, stepped in slightly on both vertical edges, and therefore of a slightly narrower width. The upper portion 29 of the slot thus has a right-hand edge 32 (as viewed in FIG. 1) which is spaced .191" from the reference edge E, and a left-hand edge 33 spaced .310" from reference edge E. The narrowed lower portion 30 of the slot has a right-hand edge 34 spaced .193" from reference edge E, and a left-hand edge 35 spaced .306" from edge E. Thus there is a step of .002" between slot edge portions 32 and 34, and a step of .004" between slot edge portions 33 and 35. Also, slot edges 32 and 34 coincide respectively with the minimum and maximum permissible spacing distances from the near edge of the sound track to reference edge E, and slot edges 33 and 35 coincide respectively with the maximum and minimum permissible spacing distances from the far edge of the sound track to the reference edge E.

To check for conformity of the sound track of a given film strip to these standards, the film strip is held over the upper edge 18 of the bridge piece, as before, but this time with care that the strip is in precise contact with the notch edge 17, i.e. in perfect coincidence with reference edge E. FIG. 3 shows a film strip F properly positioned on a diagrammatically illustrated portion of the gauge, with certain dimensions exaggerated for clarity. The film strip is shown to have a sound track S, and film frames f. As shown, with the film strip properly positioned against reference edge E, the sound track S has its right-hand or "near" edge Sn between the two stepped right-hand gauge slot edges 32 and 34, and its left-hand or remote edge Sr between the two stepped left-hand gauge slot edges 33 and 35. The sound track is in proper position, in conformity to standards, when this is the case.

The unevident feature of importance here is the extreme precision within which this determination can be made by the unaided eye. It will be seen that the proper condition obtains when, with a relatively transparent portion of a film frame f, or film with only sound track exposure, positioned in the area between the slot edge portions 33 and 35 and the track edge Sr, a narrow light slit sl can be observed along the edge 33, but not along the edge 35. In the case of the latter, of course, the track edge Sr is at its closest permissible spacing from the reference edge E when the track edge Sr coincides with the slot edge 35, so no light should be observed along edge 35. If light shows along this edge, the track edge Sr is spaced too close to the reference edge for conformity to standard.

Referring again to the light slit sl, such a slit can be easily detected by the unaided eye with a spacing distance as small as .0001" between the edge Sr of the opaque sound track and the slot edge 33 when the film and gauge are held up to the light. Accordingly, if the light slit sl can be observed, the sound track edge Sr has been printed so as not to exceed the maximum standard spacing distance from the reference edge E. Actually, of course, the sound track edge Sr could precisely coincide with the edge 33, and the sound track still be within standards. This is a matter of only .0001", however, and can be neglected for practical purposes. If thought worthwhile, this could be corrected by spacing the edge 33 an additional .0001" from the reference edge. For all practical purposes, however, the criterion as to whether the sound track edge Sr is within permissible spacing distance from the reference edge of the film is whether or not the light slit sl can be seen along the slot edge 33, but not along the edge 35. As stated above, the unaided eye can observe the presence of this light slit at a width down to the order of .0001", making the determination extremely precise, notwithstanding total absence of optical equipment.

The determination for the right-hand edge Sn of the sound track is similarly made. Thus, for similar reasons, the right-hand edge Sn of the sound track conforms to standards when a slight slit sl' can be observed between the track edge Sn and the slot edge 32, but not between track edge Sn and slot edge 34.

Reference is next directed to FIG. 4, showing a gauge 10a for gauging the film frame area of standard 35-mm. sound picture film. This gauge is identical to the gauge 10 of FIGS. 1–3 in all respects save one which will be described presently, and all parts of the gauge of FIG. 4 corresponding to parts of that of FIGS. 1–3 are identified by the same reference numerals, but with the suffix a added in the case of FIG. 4. Comparison of FIGS. 1 and 4 will reveal that the only difference in FIG. 4 is in the gauge slot 28a which is made wide enough, and located properly, for checking the positions of the two longitudinally extending edge lines bounding the picture frame area.

The line bounding the film frame area on the side of the sound track is, according to standards, either to coincide with the adjacent sound track boundary, or to overlap the latter, but by a maximum distance not to exceed .004". Under no circumstances can these boundaries be spaced apart, with a visible transparent line left therebetween on the positive. Since according to 35-mm. film sound track standards, the sound track edge adjacent to the picture area can be between .306" and .310" from the reference edge E, the picture area boundary line or margin must then be as close to the reference edge as .306", or can be as close as .302", with a possible maximum .004" overlap over the edge of the sound track. Accordingly, slot edge 32a is spaced .302" from reference edge E, and slot edge 34a is spaced .306" from edge E.

The opposite picture area boundary line is, according to standards, to fall between 1.182" and 1.186" from the reference edge E, and slot edges 33a and 35a are respectively spaced from reference edge E by these distances.

In the cases of both picture area boundary lines, just as with the sound track margins, the boundary line should reveal a light line or slit along the notch edges 32a and 33a, and no such light line or slit along the notch edges 34a and 35a, with the film strip positioned similarly to FIG. 2, and thus flattened transversely, while being held against reference edge E. The use of the picture area gauge will be fully understood without further detailed discus-

I claim:
1. A motion picture film gauge that comprises:
a flat plate having upper and lower edge portions and having a pair of longitudinally aligned upper and lower notches extending inwardly towards one another in said plate from said upper and lower edge portions, each of said notches being defined by a pair of precisely parallel opposite side edges spaced apart a distance equal to the maximum permissible film width, terminating at the bottom in a bottom edge, of which at least the bottom edge of said upper notch is straight and formed precisely at right angles to said parallel side edges of said upper notch, corresponding side edges of said upper and lower notches being in precise rectilinear alignment, so that a standard motion picture film strip can be looped over the portion of said plate between said bottom edges of said notches, positioned in said notches above and below said bottom edges, and then tautened and transversely flattened over said bottom edge of said upper notch, and the side edge of at least one of said notches being formed adjacent to the bottom edge thereof with a step which rises from said side edge by a distance equal to standard film width tolerance, and which thereby reduces the width of said last mentioned notch to minimum permissible film width.

2. A motion picture film gauge that comprises:
a flat plate having upper and lower edge portions and having a pair of longitudinally aligned upper and lower notches extending inwardly towards one another in said plate from said upper and lower edge portions, each of said notches being defined by a pair of precisely parallel opposite side edges spaced apart a distance equal to the maximum permissible film width, terminating at the bottom in a bottom edge, of which at least the bottom edge of said upper notch is straight and formed precisely at right angles to said parallel side edges of said upper notch, corresponding side edges of said upper and lower notches being in precise rectilinear alignment, so that a standard motion picture film strip can be looped over the portion of said plate between said bottom edges of said notches, positioned in said notches above and below said bottom edges, and then tautened and transversely flattened over said bottom edge of said upper notch, a pair of aligned side edges of said upper and lower notches being engageable by one edge of the film strip when so positioned in said notches and constituting a reference edge for said edge of the film strip, said plate having a slot extending inwardly therein from said bottom edge of said upper notch, said slot having at least one side edge comprised of two stepped sections both parallel to said reference edge of said gauge, and spaced therefrom at the tolerance limits of said longitudinal boundary line of said film from the reference edge of the film.

3. The subject matter of claim 2, wherein the gauge is adapted for determining conformity to standards of two opposite longitudinal boundary lines of a strip on said film, and wherein said slot has two opposite side edges, each composed of two stepped sections both parallel to said reference edge of said gauge, the two sections of one of said slot edges being spaced from said reference edge at the tolerance limits of one of said longitudinal boundary lines of the film from the reference edge of the film, and the two sections of the other of said slot edges being spaced from the reference edge of the gauge at the tolerance limits of the other of said longitudinal boundary lines of the film from the reference edge of the film.

4. The subject matter of claim 2, wherein the side edge of one of said notches, on the side of said notch opposite to the reference edge of the gauge, is formed adjacent to the bottom edge of the notch with a step which rises from said side edge by a distance equal to standard film width tolerance.

References Cited

UNITED STATES PATENTS

| | | | |
|---|---|---|---|
| 375,949 | 1/1888 | Peterson | 33—168 X |
| 843,265 | 2/1907 | Fischer | 33—168 X |
| 2,471,961 | 5/1949 | Jones | 33—168 |
| 2,837,828 | 6/1958 | Cybulski | 33—168 |
| 3,193,936 | 7/1965 | Schnitzer | 33—168 |
| 3,318,006 | 5/1967 | Martinez | 33—168 |

FOREIGN PATENTS

| | | |
|---|---|---|
| 163,984 | 9/1949 | Austria. |
| 314,831 | 10/1919 | Germany. |

SAMUEL S. MATTHEWS, *Primary Examiner.*